United States Patent [19]
Nakajima et al.

[11] Patent Number: 5,989,705
[45] Date of Patent: Nov. 23, 1999

[54] MAGNETO-OPTICAL RECORDING MEDIUM

[75] Inventors: Junsaku Nakajima, Kashihara; Yoshiteru Murakami, Nishinomiya; Akira Takahashi; Junji Hirokane, both of Nara, all of Japan

[73] Assignee: Sharp Kabushiki Kaisha, Osaka, Japan

[21] Appl. No.: 08/748,892

[22] Filed: Nov. 14, 1996

[30] Foreign Application Priority Data

Nov. 14, 1995 [JP] Japan ..................................... 7-295811
Oct. 8, 1996 [JP] Japan ..................................... 8-267566

[51] Int. Cl.$^6$ ..................................................... G11B 5/66
[52] U.S. Cl. .................. 428/332; 428/336; 428/694 ML; 428/694 SC; 428/694 NF; 428/694 MM; 428/694 IS; 428/900; 369/13
[58] Field of Search ....................... 369/13; 428/694 ML, 428/694 SC, 694 NF, 694 MM, 694 IS, 332, 336, 900

[56] References Cited

U.S. PATENT DOCUMENTS

| | | | |
|---|---|---|---|
| 4,966,821 | 10/1990 | Kawashima | 428/694 TM |
| 5,248,565 | 9/1993 | Tsutsumi | 428/694 EC |
| 5,512,366 | 4/1996 | Nakaki | 428/332 |
| 5,529,854 | 6/1996 | Shimoda | 428/694 ML |
| 5,533,001 | 7/1996 | Watanabe | 369/275.2 |
| 5,543,221 | 8/1996 | Kitakami | 428/332 |
| 5,723,227 | 3/1998 | Matsumoto | 428/694 ML |

FOREIGN PATENT DOCUMENTS 37 16 392 A1 11/1987 Germany.
1-130348 5/1989 Japan.

OTHER PUBLICATIONS

Copy of Communication dated Jul. 17, 1998, issued by the German Patent Office re corresponding German Pat. Appln. No. 196 46 896.5–53; and a translation of same.

K. Tamanoi, et al., Proceedings of Magneto–Optical Recording International Symposium, *Magnetically-Induced Super Resolution Using Magneto–Static Coupling*, J. Magn. Jpn. vol. 19, Supplement No. S1, pp. 421–424, 1995.

Primary Examiner—Leszek Kiliman
Attorney, Agent, or Firm—David G. Conlin; Richard E. Gamache

[57] ABSTRACT

A magneto-optical recording disk includes a recording layer for recording information as a mark and a reproduction layer, laminated with the recording layer, to which magnetization direction of the recording layer is transferred at high temperatures, wherein the reproduction layer and the recording layer are magnetostatically coupled and are not exchange-coupled. The information is read out by using a temperature distribution generated by a light beam for reproduction. The recording layer has, on a side thereof to which the reproduction layer is not provided, a supplementary back layer of a soft magnetic material composed of ferromagnetic material. The magneto-optical disk is designed to generate good CNR and thereby improves recording density even when a short mark is reproduced.

9 Claims, 8 Drawing Sheets

MAGNETO-OPTICAL RECORDING MEDIUM

FIELD OF THE INVENTION

The present invention relates to a magneto-optical recording medium, such as a magneto-optical disk, used in a magneto-optical recording and reproducing device.

BACKGROUND OF THE INVENTION

A magneto-optical disk, a variety of magneto-optical recording media, is already commercialized as an external memory for a computer. This example demonstrates that the magneto-optical recording medium, using light for reproduction, can realize a larger recording capacity than a floppy disk and a hard disk, using a magnetic head.

Recording density of the magneto-optical disk is limited by the size of a light beam spot on the magneto-optical disk. Specifically, if the recording bit diameter or the recording bit interval is too small in comparison to the light beam spot, the light beam spot covers more than one bit, and thereby cannot separate recording bits for reproduction. Shortening the wavelength of the laser beam is an effective way of reducing the size of the light beam spot in order to improve the recording density. Nevertheless, semiconductor laser devices currently on the market cannot produce a wavelength shorter than 680 nm, and a semiconductor laser device capable of producing a shorter wavelength is still in a development stage. Therefore, it is difficult to further improve the recording density of the magneto-optical disk with semiconductor laser devices currently on the market which are only capable of producing long wavelengths.

On the other hand, for instance, Journal of The Magnetics Society of Japan, Vol. 19, Supplement, No. S1 (1995), page 421–424 shows a method to improve recording density by improving reproduction resolution with a magneto-optical recording medium composed of two magnetostatically coupled magnetic films and temperature distribution in a light beam spot, i.e., a magnetically induced super resolution (MSR) technique using magnetostatic coupling.

A signal detected with the above-mentioned MSR technique using magnetostatic coupling has good signal quality (CNR) with a short mark length and therefore is capable of improving the recording density, compared to a method not employing the MSR technique. However, the shortest mark length possible for the method is 0.5 $\mu$m. Therefore, the method still has a problem of low CNR when the mark length is shortened to, for example, 0.25 $\mu$m in order to further improve the recording density.

SUMMARY OF THE INVENTION

It is an object of the present invention to offer a magneto-optical disk capable of obtaining good CNR and improving recording density even when a short mark is reproduced.

In order to accomplish the object, a first magneto-optical recording medium in accordance with the present invention is characterized in that it includes: a recording layer for recording information as a mark; a reproduction layer, laminated with the recording layer, to which magnetization of the recording layer is transferred at high temperatures; and a supplementary back layer of a soft magnetic material disposed on a side of the recording layer to which the reproduction layer is not provided.

With the arrangement, when a mark is reproduced, the reproduction layer is heated with an externally radiated light beam so as to transfer the magnetization direction of the recording layer to the reproduction layer. Since the supplementary back layer is a soft magnetic material, magnetic flux produced by the recording layer cross the supplementary back layer at an almost right angle. Therefore, the magnetic flux produced by the recording layer reach farther than those without the supplementary back layer.

As a result, since the magnetic field generated by magnetic moments of the recording layer becomes greater at the place of the reproduction layer, an area of the reproduction layer having magnetic moments of the same direction as the magnetic moments of the recording layer becomes larger.

In this manner, even when a mark as short as, for example, 0.25 $\mu$m is reproduced, the magneto-optical disk can generate good CNR and thus improve the recording density.

A second magneto-optical recording medium is characterized in that in addition to the above first arrangement, it further includes a non-magnetic layer, disposed between the reproduction layer and the recording layer, composed of a transparent dielectric layer disposed to face the reproduction layer and a non-magnetic metal film layer disposed to face the recording layer.

With the arrangement, when the light beam for reproduction is radiated, the light beam is reflected at the non-magnetic layer towards the reproduction layer.

Therefore, the Kerr rotation angle is enhanced, thereby increasing a reproduction output. Consequently, the magneto-optical disk can generate even better CNR and thus further improve the recording density.

DESCRIPTION OF THE EMBODIMENTS

First Embodiment

Referring to FIGS. 1 through 11, the following description will discuss an embodiment in accordance with the present invention.

Figure 2:
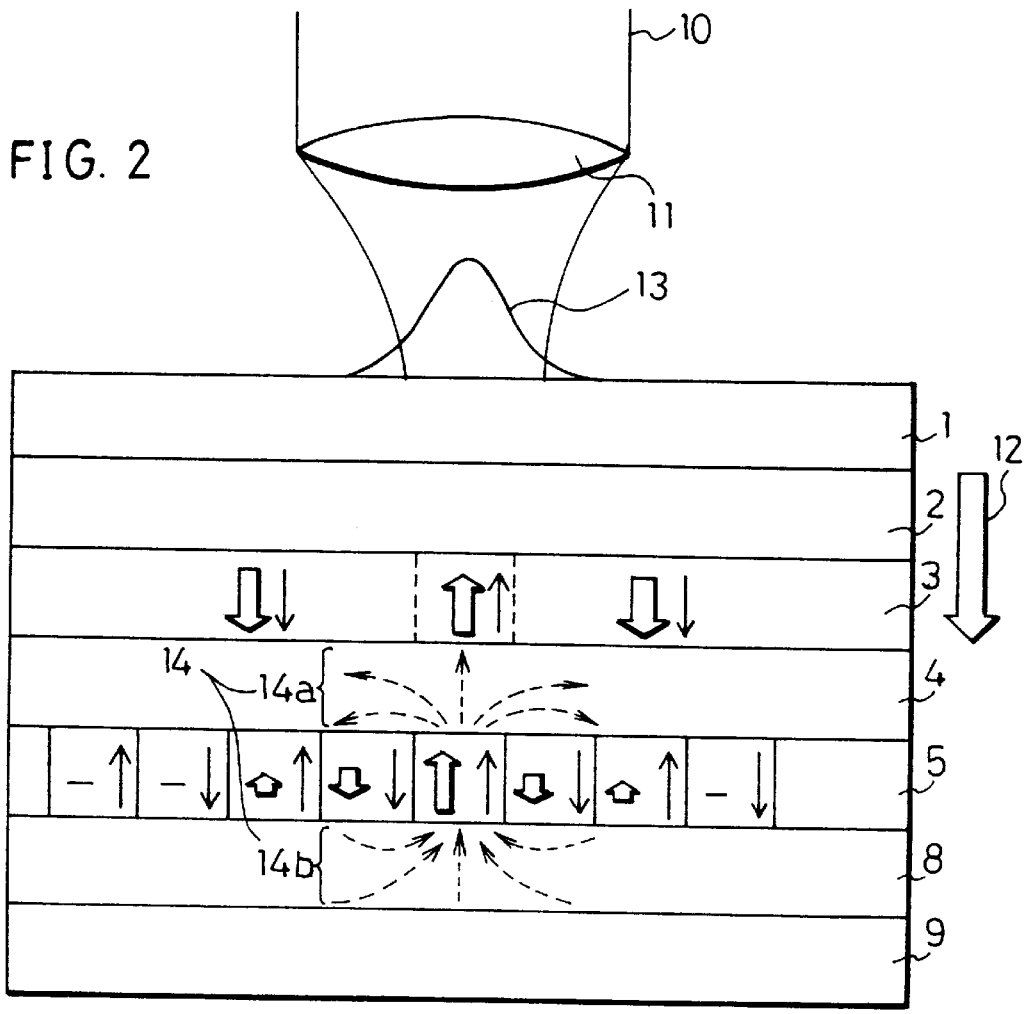
FIG. 2 is an explanatory drawing showing an arrangement example of a magneto-optical disk for comparison.

First, a conventional MSR disk for comparison using magnetostatic coupling will be explained. This magneto-optical disk for comparison, as illustrated in FIG. 2, includes a substrate 1, a transparent dielectric layer 2, a reproduction layer 3, a non-magnetic layer (first non-magnetic layer) 4, a recording layer 5, a protection layer 8 and an overcoating layer 9 laminated in this order. Recording and reproduction is carried out with an external magnetic field 12 being applied and light beam 10 being focused by an objective lens 11 at the layers 2 to 5 and 8. The light beam 10 generates a temperature distribution 13 and causes magnetic flux 14 which is leaked out of a mark (recording bit) of the recording layer 5.

The reproduction layer 3 and the recording layer 5 are composed of a rare-earth and transition metal amorphous alloy. In FIG. 2, open bold arrows denote saturation magnetization and solid line arrows denote magnetization of the transition metal.

As to the magneto-optical disk for comparison, the direction of the magnetization of the reproduction layer 3 is controlled on the basis of the temperature distribution 13 generated by the focused light beam 10. A high temperature portion of the reproduction layer 3 in an area at which the light beam 10 is radiated is thereby magnetized in the same direction as the leaking magnetic field generated out of the mark formed on the recording layer 5. Then, a low temperature portion of the reproduction layer 3 is magnetized in the same direction as the external magnetic field 12. Data recorded in the recording layer 5 with a smaller pitch than the beam diameter of the focused light beam 10 can be thus reproduced.

A polycarbonate substrate is used as the substrate 1. AlN having a film thickness of 70 nm is used as the transparent dielectric layer 2. The reproduction layer 3 is GdFeCo having a film thickness of 30 nm. The non-magnetic layer 4 is AlN having a film thickness of 15 nm. The recording layer 5 is DyFeCo having a film thickness of 40 nm. The protection layer 8 is AlN having a film thickens of 30 nm. An ultraviolet-ray-setting resin of 5 $\mu$m is formed as the overcoating layer 9.

A reproduction method will be explained in detail with reference to FIG. 3.

Figure 3:
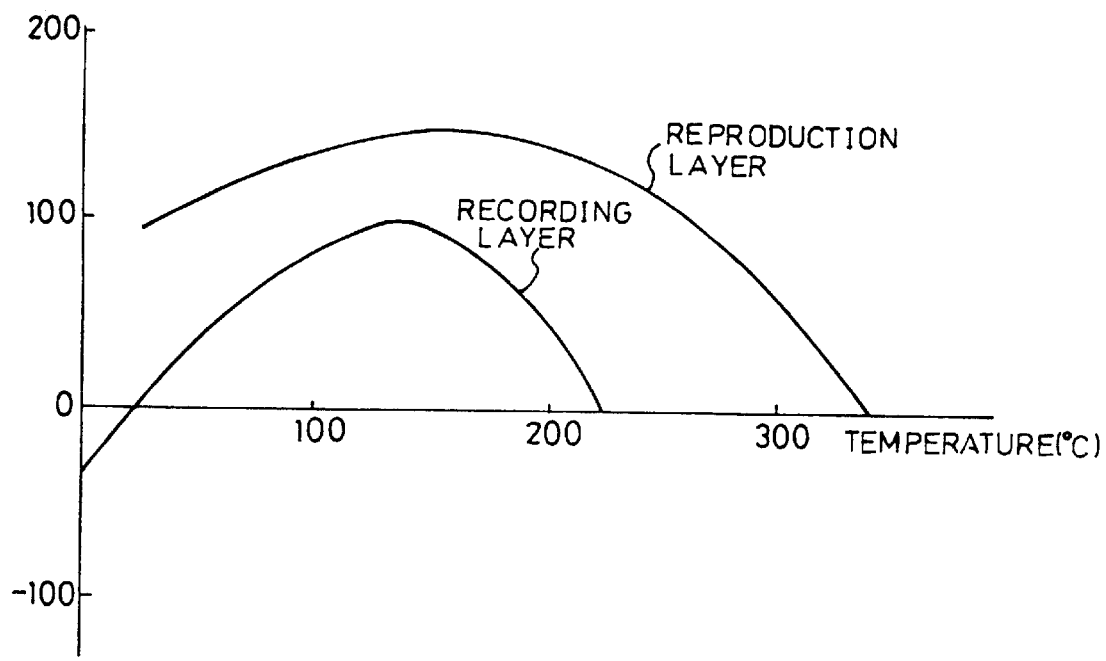
FIG. 3 is a graph showing temperature dependence of saturation magnetization of a reproduction layer and a recording layer.

FIG. 3 shows temperature dependence of saturation magnetization (will be referred to as Ms hereinafter) of the reproduction layer 3 and the recording layer 5. Both layers 3 and 5 are made of a rare-earth and transition metal amorphous alloy, and are a ferrimagnetic material. Magnetizations of the rare earth metal and of the transition metal are coupled antiparallelly. When the strength of the magnetization of the rare earth metal and that of the transition metal are equal, the sum total of the magnetizations, i.e., saturation magnetization, equals 0. A temperature realizing this state is called a compensation temperature, and a composition realizing the state is called a compensation composition.

At temperatures below the compensation temperature, the direction of the saturation magnetization of the rare-earth and transition metal alloy is the same as that of the rare earth metal, since the magnetization of the rare earth metal is greater than that of the transition metal. On the other hand, at temperatures above the compensation temperature, the direction of the saturation magnetization of the rare-earth and transition metal alloy is the same as that of the transition metal, since the magnetization of the rare earth metal is smaller than that of the transition metal. Hereinafter, a case where the magnetization of the rare earth metal is greater than that of the transition metal will be referred to as a Rare-Earth-rich (RE-rich) case, while the opposite case will be referred to as a Transition-Metal-rich (TM-rich) case.

FIG. 3 shows the saturation magnetization in the RE-rich case in negative values, and the saturation magnetization in the TM-rich case in positive values. The reproduction layer 3 has a TM-rich characteristic at room temperature, a saturation magnetization of 100 (emu/cc) and a Curie temperature of 340° C. The recording layer 5 has a compensation temperature which is equal to room temperature, a TM-rich characteristic at 140° C., a saturation magnetization of 100 (emu/cc) and a Curie temperature of 230° C.

FIG. 3 shows that a mark of the recording layer 5 which is heated with laser radiation as shown in FIG. 2 has the saturation magnetization. The saturation magnetization at a high temperature portion of the recording layer 5 generates magnetic flux 14a and 14b as shown in FIG. 2. Meanwhile, a mark in a low temperature portion of the recording layer 5 has almost no saturation magnetization since the temperature thereof is close to room temperature. Consequently, no mark in the low temperature portion generates a magnetic flux.

Among the magnetic flux generated out of the mark in the high temperature portion of the recording layer 5, the magnetic flux 14a aligns the saturation magnetization of the reproduction layer 3 in the same direction as that of the mark in the high temperature portion of the recording layer 5. Therefore, the saturation magnetization of the high temperature portion of the reproduction layer 3 has the same direction as the saturation magnetization of the mark in the high temperature portion of the recording layer 5.

On the other hand, the saturation magnetization of the low temperature portion of the reproduction layer 3 has the same direction as the external magnetic field 12, since no magnetic flux is generated out of the mark in the low temperature portion of the recording layer 5.

Figure 4:
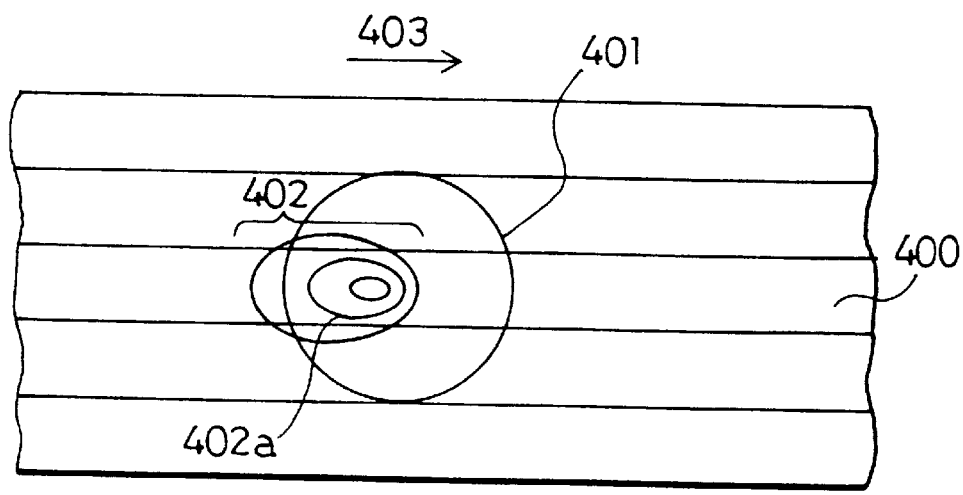
FIG. 4 is an explanatory drawing showing how the magneto-optical disk is reproduced.

FIG. 4 is a plane view of the magneto-optical disk for comparison. A light beam spot 401 moves along a track 400 formed on the disk substrate in the direction denoted by the arrow 403. As the light beam spot 401 moves, a temperature distribution denoted by temperature contours 402 is generated in the magneto-optical disk according to the speed of the light beam spot 401.

Since the light beam spot 401 is moving, the high temperature portion of the magneto-optical disk is always left behind the light beam spot 401. A temperature contour 402a, one of the temperature contours 402, is for a temperature of 120° C. The highest temperature in the high temperature portion reaches 140° C.

Figure 5:
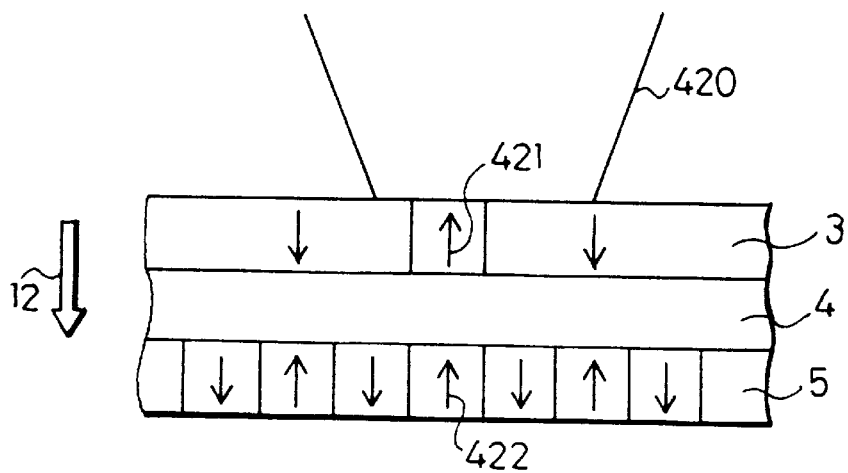
FIG. 5 is an explanatory drawing showing how the magneto-optical disk is reproduced.

FIG. 5 is a cross-sectional view of the track 400 being read out with radiation of a light beam as shown in FIG. 4.

Note that in FIG. 5, the substrate 1, the protection layer 8 and the overcoating layer 9 are omitted.

In FIG. 5, arrows show magnetization of the transition metal in each layer. Since information is recorded in the recording layer 5, neighboring arrows are pointing at opposite directions. In the reproduction layer 3, magnetization 421 of the transition metal is aligned in an area having higher temperatures than the temperature contour 402a so as to be upward in accordance with magnetization 422 of the transition metal in the recording layer 5 which is underneath the area, and is aligned in an area having lower temperatures than the temperature contour 402a so as to be downward in accordance with the external magnetic field 12.

At this time, as shown in FIG. 4, information in the recording layer 5 is read out only from an area inside the temperature contour 402a in the light beam spot 401 in the form of magnetization, and the magnetization outside the temperature contour 402a is always in the same direction in accordance with the external magnetic field 12. As a result, it is possible to read out the information in the recording layer 5 from an area smaller than the total area covered by the light beam spot 401. Therefore, it is possible to read out information with high resolution surpassing the diffraction limit of the light beam. Consequently, such a magneto-optical disk can be read out with higher resolution than an ordinary magneto-optical recording medium having only one magnetic layer formed on the substrate thereof, thereby improving the recording density.

Figure 6:
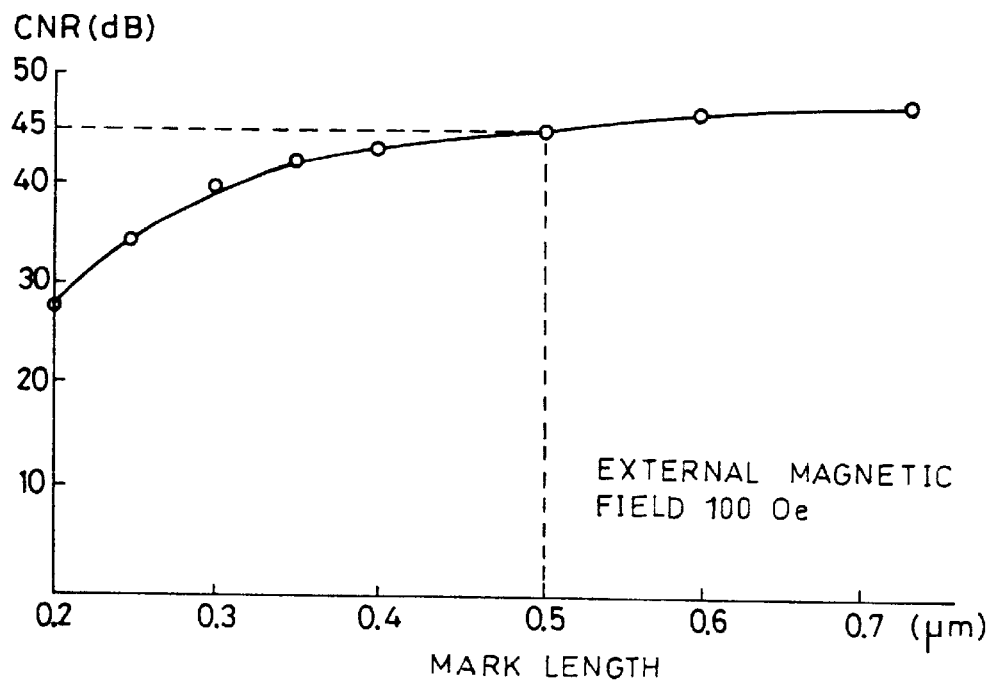
FIG. 6 is a graph showing correlation between recording mark lengths of the magneto-optical disk for comparison and reproduced signal quality (CNR).

FIG. 6 shows correlation between reproduced signal quality (CNR) and mark lengths when the magneto-optical disk for comparison is reproduced with the following conditions: a linear velocity of 5 m/s, a laser radiation wavelength of 680 nm, an external magnetic field of 100 (Oe), and a reproduction laser power of 2.3 mW.

Figure 7:
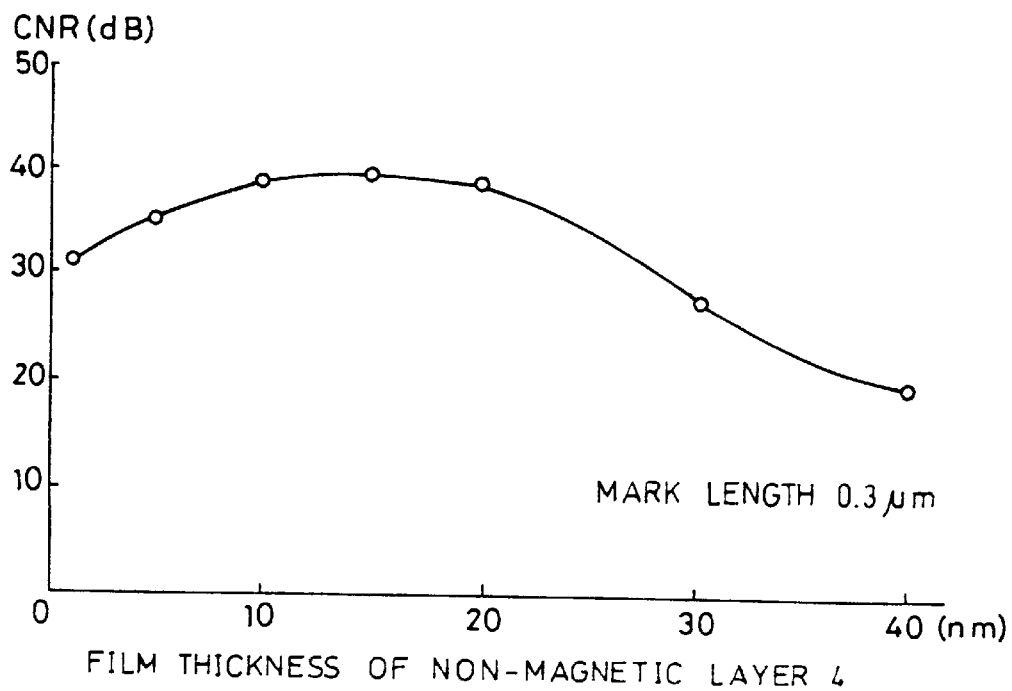
FIG. 7 is a graph showing influence by film thicknesses of a non-magnetic layer of the magneto-optical disk for comparison on reproduced signal quality (CNR).

FIG. 7 shows how CNR for reproduction of a 0.3 μm long mark varies depending on film thicknesses of the non-magnetic layer 4 of the magneto-optical disk for comparison. Measurements are conducted under the same conditions as of FIG. 6. When the film thickness of the non-magnetic layer 4 is 20 nm or more, the magnetic field generated by the recording layer 5 at the reproduction layer 3 is too weak. Thus, CNR decreases. What causes the decrease of CNR when the non-magnetic layer 4 has a film thickness of 5 nm or less is not clear. However, it is assumed that CNR decreases because a uniform and smooth film is not formed due to the too thin film thickness of the non-magnetic layer 4. FIG. 7 shows that the non-magnetic layer 4 having a film thickness of about 15 nm is appropriate for this magneto-optical disk for comparison.

Next, a magneto-optical recording medium in accordance with the present invention will be explained.

Figure 1:
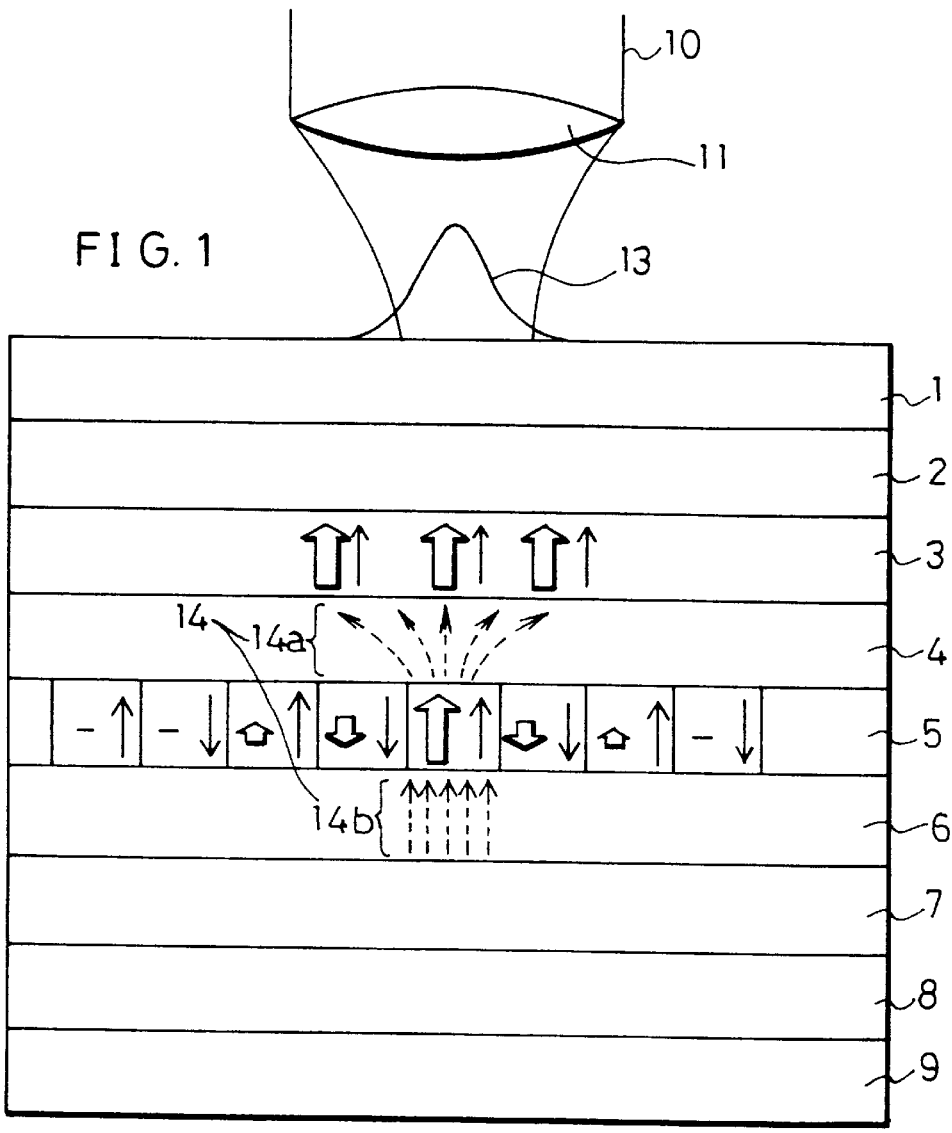
FIG. 1 is an explanatory drawing showing an arrangement example of a magneto-optical disk in accordance with the present invention.

As shown in FIG. 1, a magneto-optical disk (magneto-optical recording medium) is produced so as to include an arrangement in which a substrate 1, a transparent dielectric layer 2, a reproduction layer 3, a non-magnetic layer (first non-magnetic layer) 4, a recording layer 5, non-magnetic layer (second non-magnetic layer) 6, a supplementary back layer 7, a protection layer 8 and an overcoating layer 9 are laminated in this order.

The non-magnetic layer 6 is AlN having a film thickness of 10 nm. The supplementary back layer 7 is composed of permalloy, which is soft magnetic material composed of ferromagnetic material, having a film thickness of 20 nm, and magnetostatically coupled with the recording layer 5. The other layers 2 through 5, 8, 9 and the substrate 1 are of the same materials and have the same thickness as those of the above mentioned magneto-optical disk for comparison.

The recording layer 5 records information as a mark (recording bit). The reproduction layer 3 is laminated above and magnetostatically coupled with the recording layer 5. However, the reproduction layer 3 and the recording layer 5 are not exchange-coupled. The magnetization direction of the recording layer 5 is transferred to the reproduction layer 3, using the temperature distribution generated by the light beam during reproduction. The information recorded in the recording layer 5 is thus read out from the reproduction layer 3.

Figure 8:
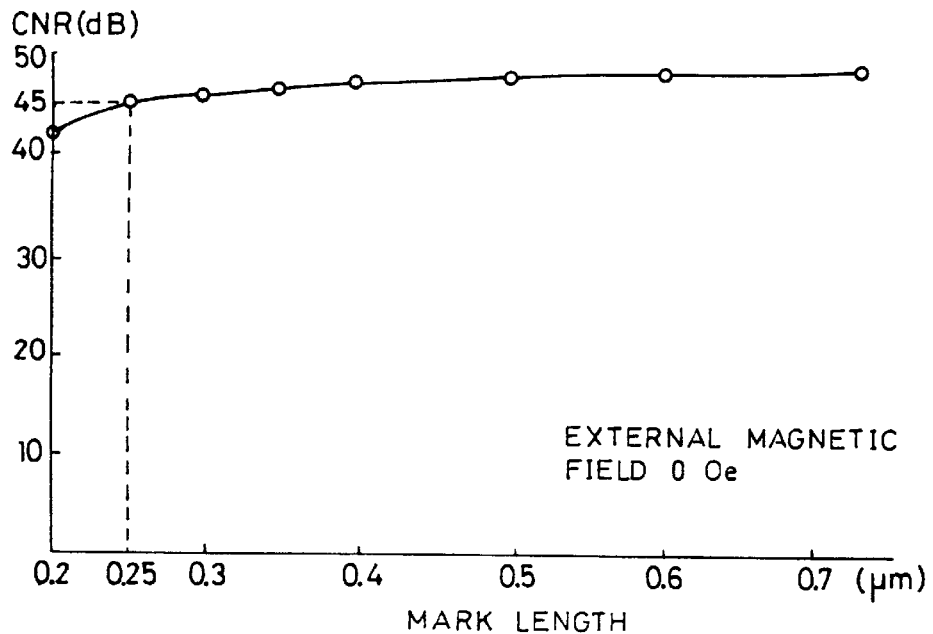
FIG. 8 is a graph showing correlation between recording mark lengths of the magneto-optical disk in accordance with the present invention and reproduced signal quality (CNR).

FIG. 8 shows correlation between CNR and mark lengths when the magneto-optical disk is reproduced with the following conditions: a linear velocity of 5 m/s, a laser radiation wavelength of 680 nm, no external magnetic field applied, and a reproduction laser power of 2.5 mW. From comparison of FIGS. 6 and 8, we can see that the magneto-optical disk in accordance with the present invention generates greater CNR with shorter mark lengths.

Usually, CNR of 45 dB or greater is necessary to accurately reproduce information by processing a reproduced signal. The conventional magneto-optical disk, as shown in FIG. 6, generates CNR of 45 dB or greater for mark lengths of 0.5 μm or longer. Meanwhile, the magneto-optical disk in accordance with the present invention, as shown in FIG. 8, generates CNR of 45 dB or greater for mark lengths of 0.25 μm or longer, thus improving the recording density.

The following description will discuss reason for the improvement of CNR for short mark lengths.

Figure 9:
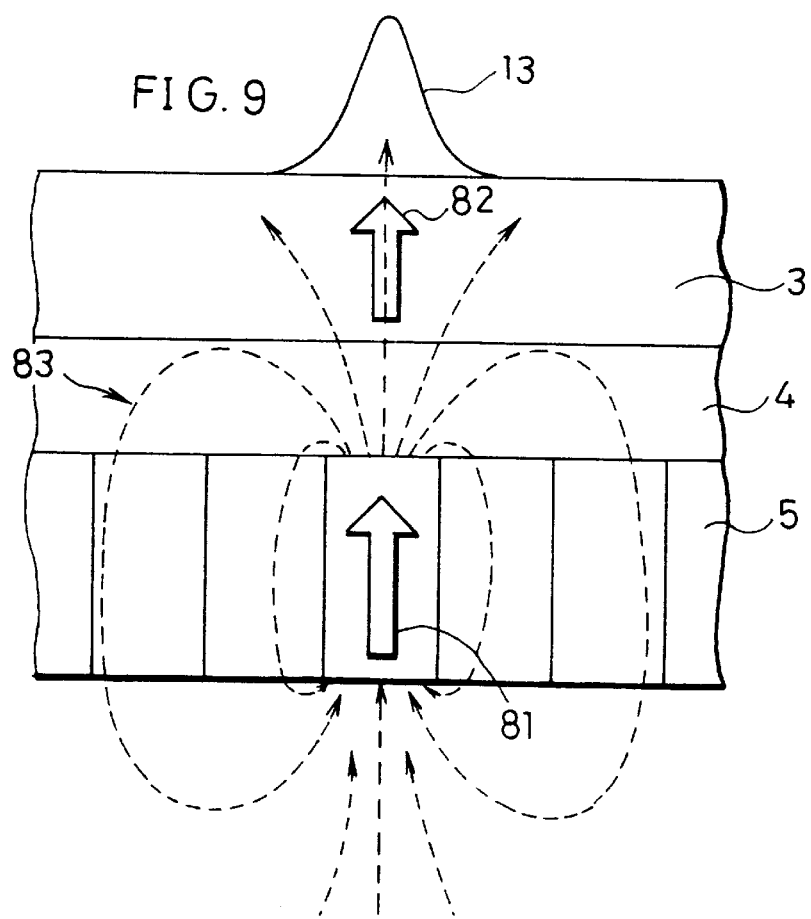
FIG. 9 is an explanatory drawing showing magnetic flux produced by the recording layer and magnetic moments of both layers when the magneto-optical disk for comparison is reproduced.

FIG. 9 is an enlarged view of the reproduction layer 3, the non-magnetic layer 4 and the recording layer 5 of the magneto-optical disk for comparison shown in FIG. 2. In the recording layer 5, only a mark in the high temperature portion has saturation magnetization, and therefore, magnetic moments 81 are generated only in that portion. Magnetic flux 83 are generated by the magnetic moments 81. Magnetic flux density 83, i.e., magnetic field at the reproduction layer 3, aligns magnetic moments 82 of the reproduction layer 3 in the same direction as the magnetic moments 81 of the recording layer 5.

How easily the magnetic moments 82 are aligned in the same direction as the magnetic moments 81 depends on the strength of a magnetic field generated by the magnetic moments 81 at the magnetic moments 82. The stronger the magnetic field is, the more easily the magnetic moments 82 follow the magnetic moments 81. This means that the stronger magnetic field the recording layer 5 generates at the reproduction layer 3, the more among the magnetic moments 82 of the reproduction layer 3 follow the magnetic moments 81 of the recording layer 5, that is, in the reproduction layer 3, an area having magnetic moments of the same direction as the magnetic moments 81 of the recording layer 5 becomes larger.

Generally, a smaller mark generates less magnetic flux and a smaller magnetic field. This is the reason for the decrease of CNR for short mark lengths in FIG. 6. To describe it in the other way round, it is concluded that if the recording layer 5 generates a stronger magnetic field at the reproduction layer 3, CNR is improved even with a small mark length.

Figure 10:
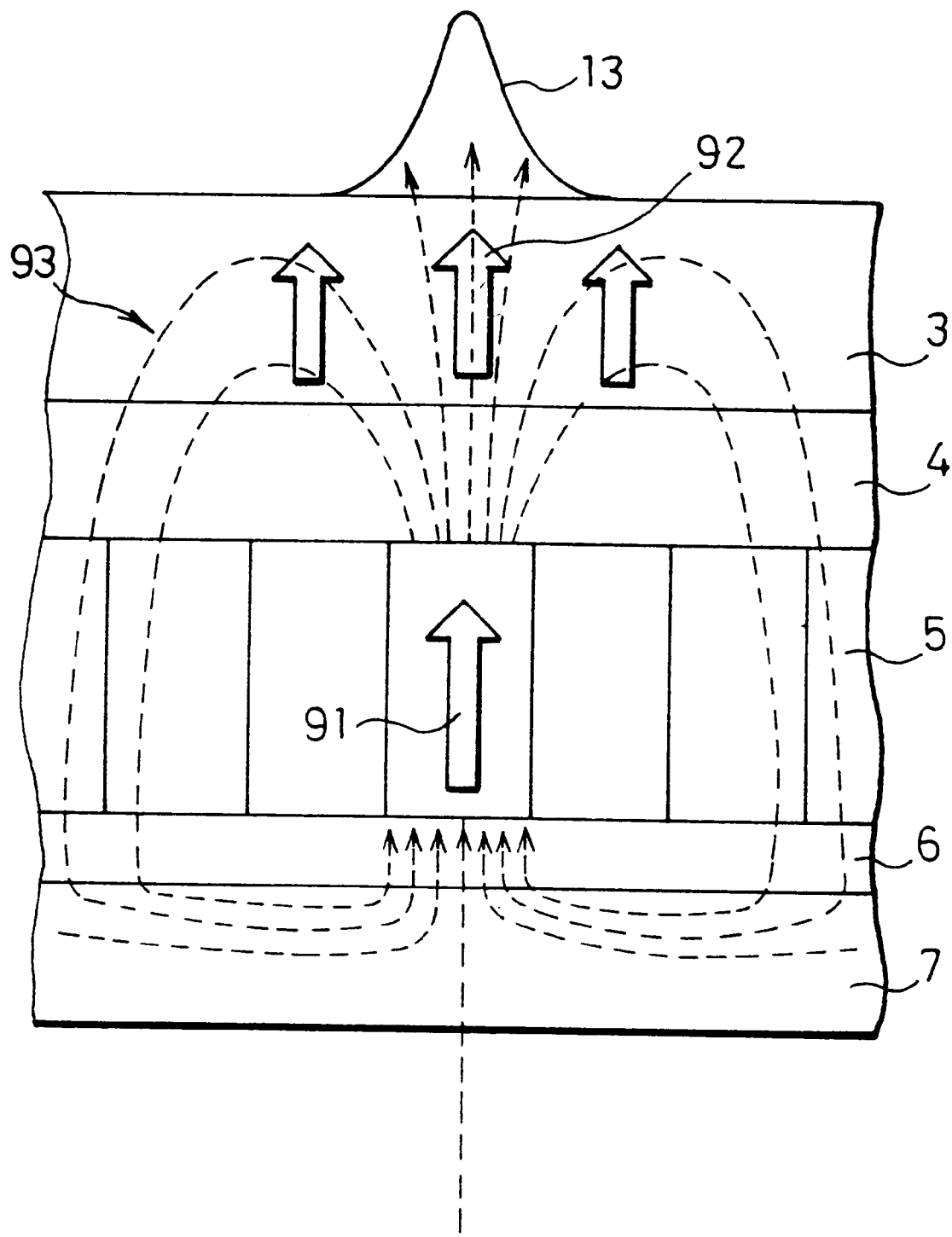
FIG. 10 is an explanatory drawing showing magnetic flux produced by the recording layer and magnetic moments of both layers when the magneto-optical disk in accordance with the present invention is reproduced.

FIG. 10 is an enlarged view of the reproduction layer 3, the non-magnetic layer 4, the recording layer 5, the non-magnetic layer 6 and the supplementary back layer 7 of the magneto-optical disk of the present embodiment shown in FIG. 1. Magnetic moments 91 generated at the recording layer 5 generate magnetic flux 93, while the reproduction layer 3 has magnetic moments 92. From comparison of FIGS. 9 and 10, we can see that how the supplementary back layer 7 influences the magnetic flux 93 generated by the magnetic moments 91 of the recording layer 5.

Specifically, since the supplementary back layer 7 is composed of permalloy, which is soft magnetic material, the magnetic flux 93 are nearly perpendicular to the supplementary back layer 7 as shown in FIG. 10. This means that the magnetic flux 93 in FIG. 10 reaches farther than in FIG. 9. In other words, the magnetic field generated at the reproduction layer 3 by the magnetic moments 91 of the recording layer 5 is larger in FIG. 10 than in FIG. 9. Therefore, the magnetostatic coupling between the recording layer 5 and the reproduction layer 3 is stronger in FIG. 10 than in FIG. 9.

Since the supplementary back layer 7 is provided, a larger area in the reproduction layer 3 has magnetic moments of the same direction as that of the magnetic moments 91 of the recording layer 5 for the reasons mentioned above. In other words, in the reproduction layer 3, the recording bit (mark) is transferred from the recording layer 5 to a larger area. In short, a small recording bit in the recording layer 5 is transferred to a large area in the reproduction layer 3. Consequently, CNR is improved for reproduction of such a small recording bit (i.e., a short mark) in the recording layer 5. Good signal quality is thus obtained.

The above has been the discussion on how the magneto-optical disk of the present embodiment improves CNR for short mark lengths.

Figure 11:
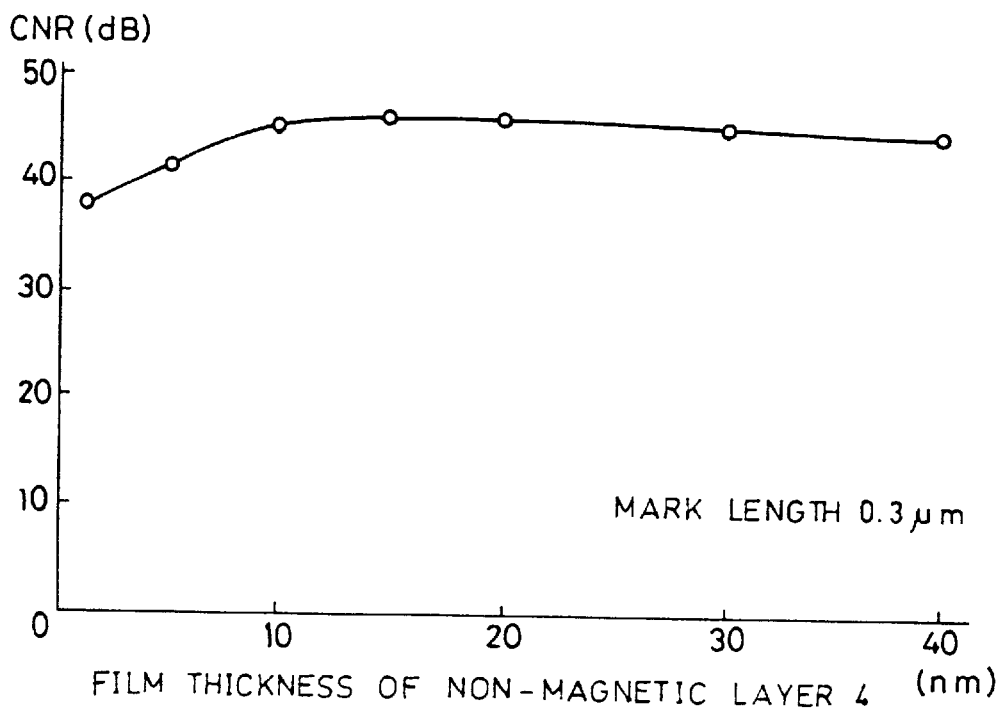
FIG. 11 is a graph showing influence by film thicknesses of a non-magnetic layer of the magneto-optical disk in accordance with the present invention on reproduced signal quality (CNR).

FIG. 11 shows how CNR varies depending on film thicknesses of the non-magnetic layer 4 of the magneto-optical disk when a 0.3 µm long mark is reproduced. Measurements are conducted under the same conditions as of FIG. 8. Correlation between CNR and the film thickness of the non-magnetic layer 4 shown in FIG. 11 is the same as that shown in FIG. 7. However, CNR deteriorates less for great film thicknesses in FIG. 11 than in FIG. 7. This is because the magneto-optical disk of the present embodiment allows the magnetic flux generated out of the recording layer 5 to reach farther than the magneto-optical disk for comparison.

Second Embodiment

Referring to FIGS. 1, 2, 8, 12, 13 and 15, the following description will discuss another embodiment in accordance with the present invention. Here, for convenience, members of the second embodiment that have the same arrangement and function as members of the first embodiment, and that are mentioned in the first embodiment are indicated by the same reference numerals and description thereof is omitted.

Figure 12:
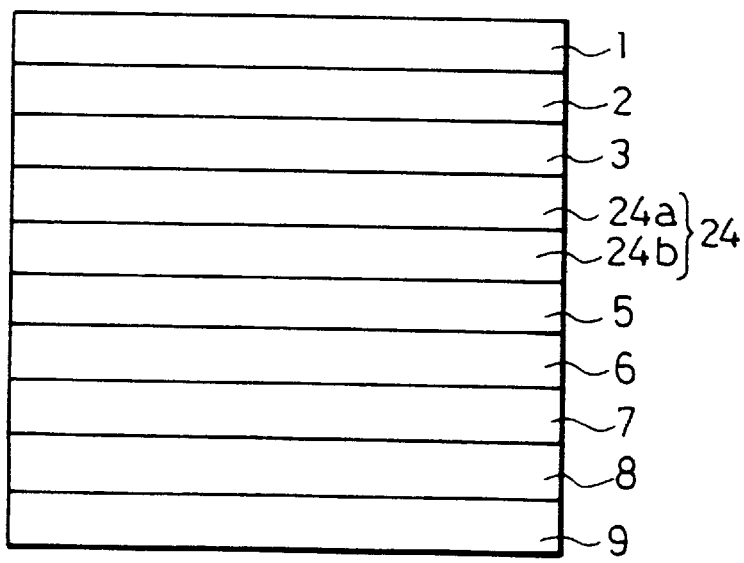
FIG. 12 is an explanatory drawing showing another arrangement example of a magneto-optical disk in accordance with the present invention.

As shown in FIG. 12, a magneto-optical disk (magneto-optical recording medium) is produced so as to include an arrangement in which a substrate 1, a transparent dielectric layer 2, a reproduction layer 3, a non-magnetic layer (first non-magnetic layer) 24, a recording layer 5, a non-magnetic layer (second non-magnetic layer) 6, a supplementary back layer 7, a protection layer 8 and an overcoating layer 9 are laminated in this order.

The non-magnetic layer 24 is composed of a transparent dielectric layer 24a and a non-magnetic metal film layer 24b, of which the transparent dielectric layer 24a is closer to the reproduction layer 3.

The reproduction layer 3 is GdFeCo having a film thickness of 20 nm. The transparent dielectric layer 24a is AlN having a film thickness of 30 nm. The non-magnetic metal film layer 24b is composed of Al having a film thickness of 10 nm. The other layers 2 and 5 through 9 have the same arrangement as in the first embodiment.

Figure 13:
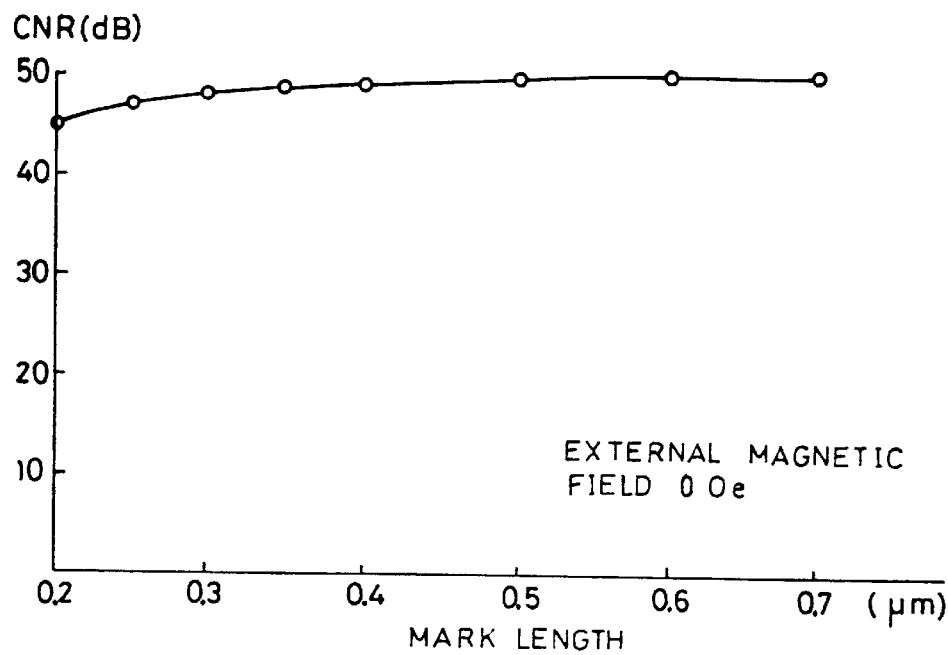
FIG. 13 is a graph showing correlation between recording mark lengths of the magneto-optical disk in accordance with the present invention and reproduced signal quality (CNR).

FIG. 13 shows correlation between CNR and mark lengths when the magneto-optical disk is reproduced with the following conditions: a linear velocity of 5 m/s, a laser radiation wavelength of 680 nm, no external magnetic field applied, and a reproduction laser power of 2.5 mW. FIG. 13 shows that the magneto-optical disk generates good CNR of 45 dB or greater for a mark length as short as 0.2 µm. In other words, compared to the first embodiment shown in FIG. 8, the second embodiment generates even greater CNR for shorter mark lengths than the first embodiment, thus enabling recording density to be further improved. The reasons for the greater CNR for the second embodiment than for the first embodiment will be explained in the following.

Figure 15:
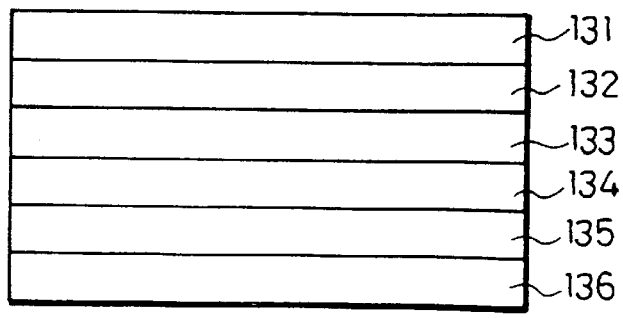
FIG. 15 is an explanatory drawing showing an arrangement example of a conventional magneto-optical disk.

FIG. 15 is a cross-sectional view of a magneto-optical disk currently on the market. On a substrate 131 are laminated a transparent dielectric layer 132, a recording layer 133, a transparent dielectric layer 134, a reflective film layer 135 and an overcoating layer 136. AlN, SiN and the like are used for the transparent dielectric layer 132 and the transparent dielectric layer 134. Rare-earth and transition metal amorphous alloys such as TbFeCo and DyFeCo are used for the recording layer 133. Al and the like are used for the reflective film layer 135. A structure including the substrate 131 and the layers 132 through 135 is called a reflective film structure. The magneto-optical disk with the reflective film layer 135 produces better signal quality than that without the reflective film layer.

As shown in FIG. 12, the magneto-optical disk of the present embodiment employs the reflective film structure for the substrate 1, the transparent dielectric layer 2, the reproduction layer 3, the transparent dielectric layer 24a and the non-magnetic metal film layer 24b. Meanwhile, as shown in FIG. 1, the magneto-optical disk of the first embodiment does not employ the reflective film structure for the substrate 1 and the layers 2 through 5, since the recording layer 5 is a layer having information. Therefore, the magneto-optical disk of the present embodiment generates even greater CNR than that of the first embodiment.

Note that the magneto-optical disk of the present embodiment shown in FIG. 12 minus the supplementary back layer 7 would be essentially the same as the MSR disk shown in FIG. 2 for comparison which uses magnetostatic coupling and thereby incapable of generating enough CNR. In other words, the reflective film structure cannot be formed without the inclusion of the supplementary back layer 7.

Third Embodiment

Figure 14:
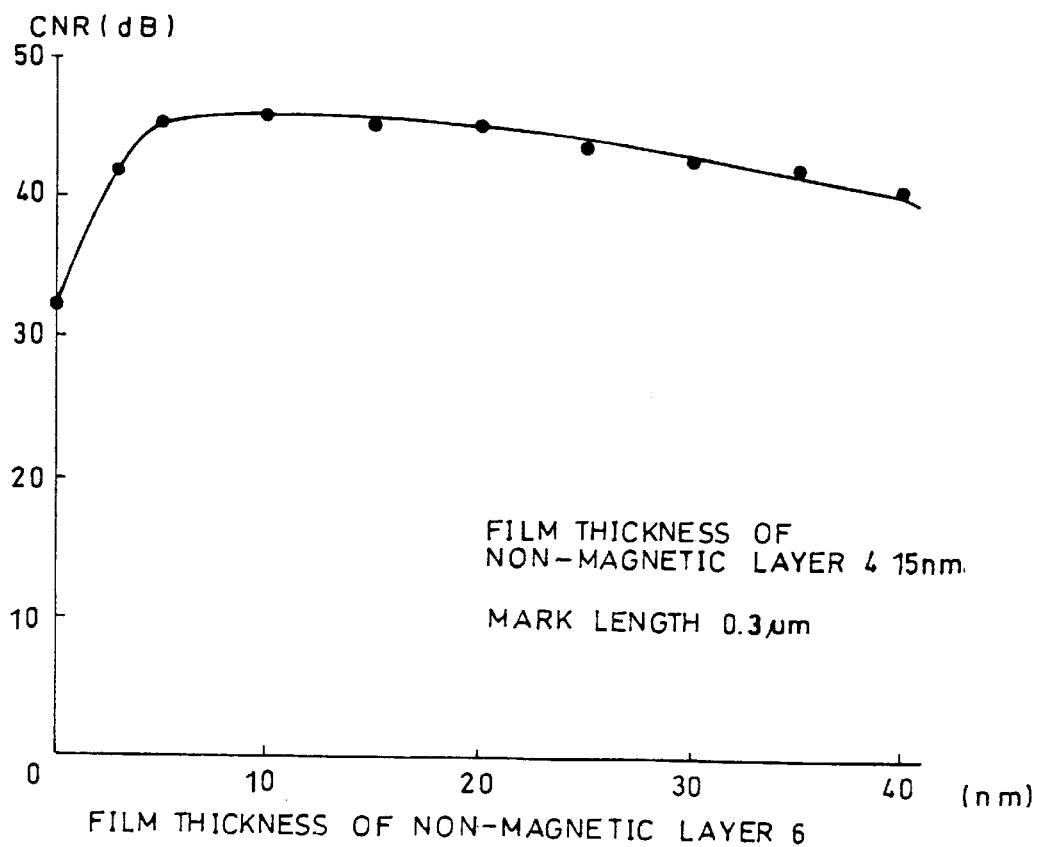
FIG. 14 is a graph showing influence by film thicknesses of a non-magnetic layer of the magneto-optical disk in accordance with the present invention on reproduced signal quality (CNR).

Referring to FIGS. 1, 11 and 14, the following description will discuss even another embodiment in accordance with the present invention. Here, for convenience, members of the third embodiment that have the same arrangement and function as members of the first and second embodiments, and that are mentioned in the first and second embodiments are indicated by the same reference numerals and description thereof is omitted.

A magneto-optical disk is produced with a minor change in the magneto-optical disk (magneto-optical recording medium) shown in FIG. 1: the non-magnetic layer (first non-magnetic layer) 4 is AlN having a film thickness of 15 nm, while the other layers 2, 3 and 5 through 9 and the substrate 1 are of the same materials and have the same thickness as those of the magneto-optical disk (magneto-optical recording medium) of the first embodiment in accordance with the present invention.

FIG. 14 shows how CNR for reproduction of a 0.3 µm long mark varies depending on film thicknesses of the non-magnetic layer 6. Measurements are conducted under the same conditions as of FIG. 8.

From comparison of FIGS. 11 and 14, we can see that the film thickness of the non-magnetic layer 6 influences CNR more than that of the non-magnetic layer 4.

FIG. 14 shows that when the film thickness of the non-magnetic layer 6 ($D_6$) is in the range:

$$5 \text{ nm} \leq D_6 \leq 20 \text{ nm},$$

CNR is 45 dB or greater, thereby producing good signal quality. Meanwhile, FIG. 11 shows that when the film thickness of the non-magnetic layer 4 ($D_4$) is in the range:

$$10 \text{ nm} \leq D_4 \leq 20 \text{ nm},$$

CNR is 45 dB or greater, thereby producing good signal quality.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A magneto-optical recording medium, comprising:

a recording layer for recording information as a mark;

a reproduction layer, laminated with the recording layer, to which magnetization direction of the recording layer is transferred at high temperatures;

a supplementary back layer of a soft magnetic material disposed on a side of the recording layer to which the reproduction layer is not provided;

a first non-magnetic layer disposed between the reproduction layer and the recording layer; and a second non-magnetic layer disposed between the recording layer and the supplementary back layer, wherein the first non-magnetic layer has a film thickness of not less than 10 nm and not more than 20 nm, and the second non-magnetic layer has a film thickness of not less than 5 nm and not more than 20 nm.

2. The magneto-optical recording medium as defined in claim 1, wherein the supplementary back layer strengthens a magnetic field generated by the recording layer at the reproduction layer.

3. The magneto-optical recording medium as defined in claim 1, wherein the reproduction layer and the recording layer are magnetostatically coupled and are not exchange-coupled.

4. The magneto-optical recording medium as defined in claim 1, wherein each of the reproduction layer and the recording layer is a perpendicularly magnetized film composed of a rare-earth and transition metal amorphous alloy, the reproduction layer exhibits a TM-rich characteristic at room temperature, the recording layer has a compensation temperature at room temperature, exhibits a TM-rich characteristic at temperatures in a range not lower than room temperature, and has a Curie temperature lower than the Curie temperature of the reproduction layer.

5. The magneto-optical recording medium as defined in claim 1, wherein the supplementary back layer is a permalloy.

6. The magneto-optical recording medium as defined in claim 1, wherein the first non-magnetic layer is composed of a transparent dielectric layer disposed to face the reproduction layer and a non-magnetic metal film layer disposed to face the recording layer.

7. The magneto-optical recording medium as defined in claim 6, wherein the transparent dielectric layer is AlN.

8. The magneto-optical recording medium as defined in claim 6, wherein the non-magnetic metal film layer is Al.

9. The magneto-optical recording medium as defined in claim 1, wherein the first and second non-magnetic layers are AlN.

* * * * *